(12) United States Patent
Cho et al.

(10) Patent No.: US 11,444,487 B2
(45) Date of Patent: Sep. 13, 2022

(54) WIRELESS CHARGE/DISCHARGE FLEXIBLE ENERGY STORAGE DEVICES

(71) Applicant: North Carolina Agricultural and Technical State University, Greensboro, NC (US)

(72) Inventors: Sungjin Cho, Summerfield, NC (US); Pankaj Kumar Alaboina, Greensboro, NC (US)

(73) Assignee: North Carolina Agricultural and Technical State University, Greensboro, NC (US)

(*) Notice: Subject to any disclaimer, the term of this patent is extended or adjusted under 35 U.S.C. 154(b) by 272 days.

(21) Appl. No.: 16/765,919

(22) PCT Filed: Nov. 21, 2018

(86) PCT No.: PCT/US2018/062281
§ 371 (c)(1),
(2) Date: May 21, 2020

(87) PCT Pub. No.: WO2019/104193
PCT Pub. Date: May 31, 2019

(65) Prior Publication Data
US 2020/0366130 A1    Nov. 19, 2020

Related U.S. Application Data

(60) Provisional application No. 62/589,112, filed on Nov. 21, 2017.

(51) Int. Cl.
*H02J 50/10*    (2016.01)
*H01M 10/42*    (2006.01)
*H02J 7/00*     (2006.01)

(52) U.S. Cl.
CPC ........... *H02J 50/10* (2016.02); *H01M 10/425* (2013.01); *H02J 7/0042* (2013.01)

(58) Field of Classification Search
CPC ...... H02J 50/10; H02J 7/0042; H01M 10/425; H01M 2220/30; H01M 10/0436;
(Continued)

(56) References Cited

U.S. PATENT DOCUMENTS 5,478,668 A * 12/1995 Gozdz ................... H01M 10/05
                                                              429/185
9,118,188 B2 * 8/2015 Doyle ................. H02J 7/00036
(Continued)

FOREIGN PATENT DOCUMENTS

WO    WO 2015/035924    3/2015
WO    WO 2016/003762    1/2016

OTHER PUBLICATIONS

International Search Report and Written Opinion corresponding to PCT application No. PCT/US2018/062281 dated Feb. 5, 2019.
(Continued)

*Primary Examiner* — Jared Fureman
*Assistant Examiner* — Michael J Warmflash
(74) *Attorney, Agent, or Firm* — Jenkins, Wilson, Taylor & Hunt, P.A.

(57) ABSTRACT

The presently disclosed subject matter relates generally to a wireless charge-discharge (WCD) energy storage device that includes an anode element, a cathode element that is proximately positioned to the anode element, a receiver coil element concentrically encircling each of the anode element and the cathode element, and a transmitter coil element concentrically encircling each of the receiver coil element, the anode element, and the cathode element. The WCD storage device further includes a switch element that i) when set to a first position establishes a connection between the
(Continued)

transmitter coil element and the cathode element that permits the transmitter coil to generate a magnetic field and ii) when set to a second position prevents the connection between the transmitter coil element and the cathode element such that the receiver coil element is configured carry an induced current when the receiver coil element is positioned within a magnetic field.

18 Claims, 6 Drawing Sheets

(58) Field of Classification Search
CPC ......... H01M 10/0463; H01M 10/4257; H01M 10/44; H01M 10/46; Y02E 60/10
See application file for complete search history.

(56) References Cited

U.S. PATENT DOCUMENTS

| | | | |
|---|---|---|---|
| 9,143,000 B2* | 9/2015 | Leabman | H02J 50/40 |
| 9,197,094 B2 | 11/2015 | Van Wiemeersch et al. | |
| 9,318,915 B2 | 4/2016 | Miller et al. | |
| 10,277,280 B2 | 4/2019 | Milne et al. | |
| 10,727,540 B2* | 7/2020 | Takami | H01M 50/20 |
| 2004/0131897 A1* | 7/2004 | Jenson | H01M 10/46 |
| | | | 429/162 |
| 2009/0039828 A1* | 2/2009 | Jakubowski | H02J 7/342 |
| | | | 320/106 |
| 2012/0013295 A1* | 1/2012 | Yeh | H02J 50/90 |
| | | | 320/108 |
| 2014/0234672 A1* | 8/2014 | Kwon | H01M 50/116 |
| | | | 429/7 |
| 2014/0253025 A1 | 9/2014 | Van Wiemeersch et al. | |
| 2015/0015180 A1* | 1/2015 | Miller | H02J 7/0047 |
| | | | 320/103 |
| 2015/0037661 A1* | 2/2015 | Lee | H01M 50/209 |
| | | | 429/163 |
| 2015/0195009 A1* | 7/2015 | Wang | H02J 7/025 |
| | | | 455/573 |
| 2015/0311740 A1* | 10/2015 | Hilario | H01F 38/14 |
| | | | 320/108 |
| 2015/0326063 A1 | 11/2015 | Leabman et al. | |
| 2017/0063431 A1* | 3/2017 | Milne | H04B 5/0037 |

OTHER PUBLICATIONS

International Preliminary Report on Patentability corresponding to PCT application No. PCT/US2018/062281 dated Jun. 4, 2020.

J.S. Kim, et al., "A half millimeter thick coplanar flexible battery with wireless recharging capability", Nano Letters, vol. 15(4), pp. 2350-2357 (2015).

S. Xu, et al., Stretchable batteries with self-similar serpentine interconnects and integrated wireless recharging systems, Nature Communication, vol. 4(1), pp. 1-8 (2013).

Alaboina et al., "Mechanically prelithiated dilicon nano alloy as highly engineered anode material", Electrochimica Acta, 258 pp. 623-630 (2017).

* cited by examiner

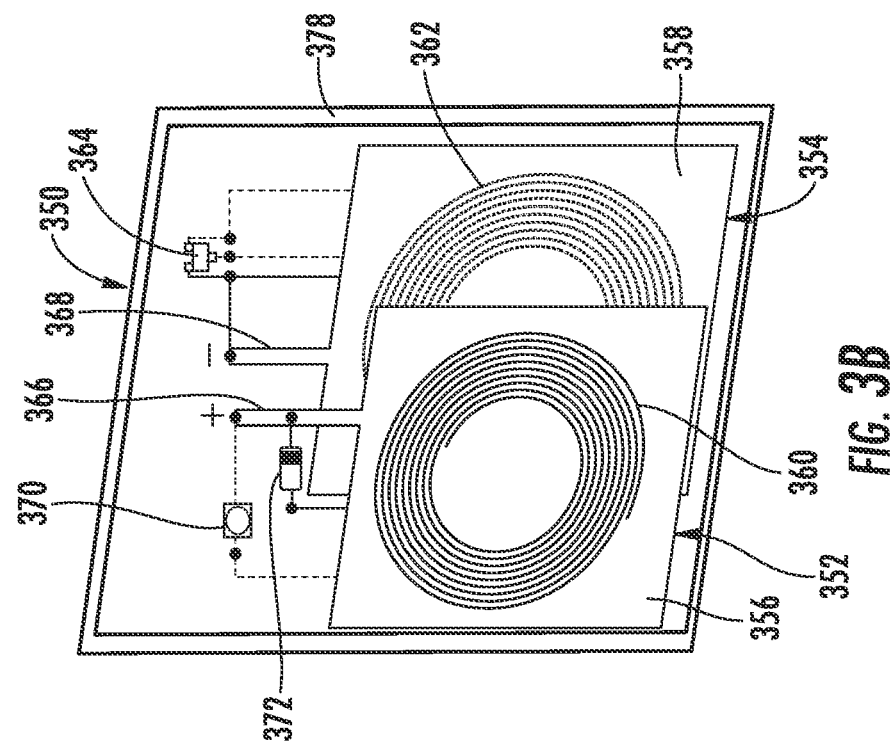
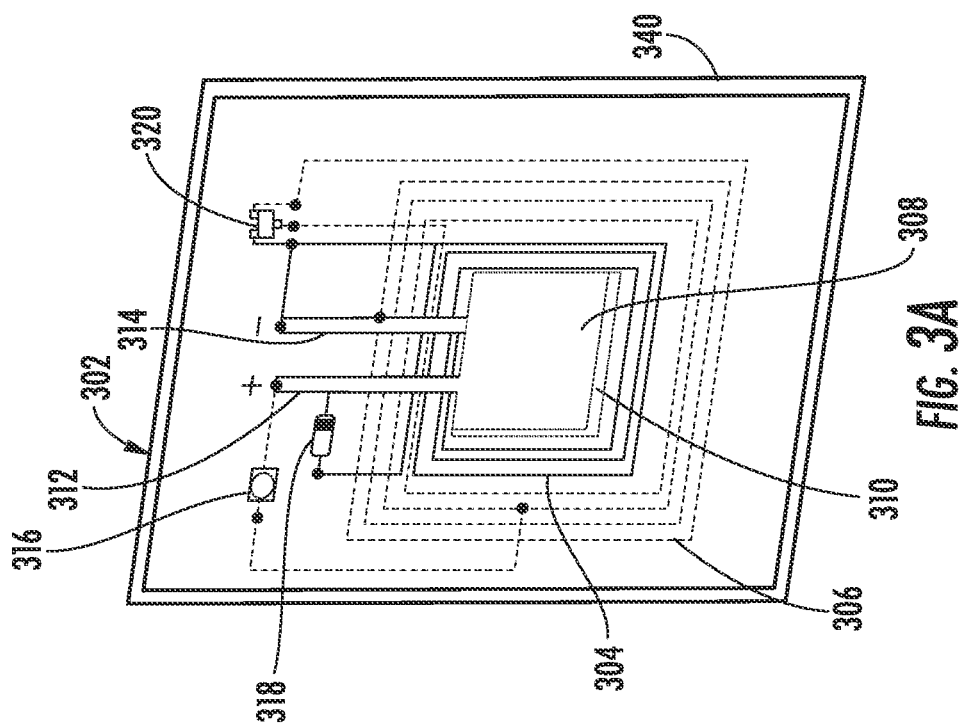

WIRELESS CHARGE/DISCHARGE FLEXIBLE ENERGY STORAGE DEVICES

RELATED APPLICATIONS

This application is a national stage filing of PCT International Application No. PCT/US2018/062281, filed Nov. 21, 2018, incorporated herein by reference in its entirety, which claims priority to U.S. Provisional Patent Application Ser. No. 62/589,112, filed Nov. 21, 2017; the disclosure of which is incorporated herein by reference in its entirety

TECHNICAL FIELD

The subject matter described herein generally relates to wireless charging and discharging via magnetic induction. More particularly, the subject matter described herein relates to a wireless charge/discharge (WCD) energy storage device.

BACKGROUND

Wireless power technology refers to the process of powering electronic devices through the air without using physical wire connectors. This technology was first proposed by Nikola Tesla in the late 1800s and since then researchers have developed a variety of different power transmission technologies. Electromagnetic inductive coupling is one of the more widely commercialized technologies and is currently used in numerous applications, including but not limited to, wireless mobile phone chargers, electric toothbrushes, power tools, medical implants, smart cards, and the like.

In a traditional wireless battery charging system, battery terminals are connected via wire connections to an external individual receiver coil unit that inductively couples to a nearby transmitter coil unit. Notably, the transmitter coil unit can be powered and/or sourced by a wall outlet power supply via an electrical cord. The varying magnetic field created by the alternating current (AC) flowing through the transmitter coil induces a current in the nearby receiver coil, which in turn charges the battery unit of the target or receiving wireless device. Typically, the receiver coil unit connected to the battery unit needs to be placed in close proximity to the stationary transmitter coil unit in order for power to be wirelessly transferred via the magnetic field. As such, the overall system must be proximately located to (and cannot be readily moved from) the wall outlet power supply.

Accordingly, there exists a need for an improved wireless charge/discharge energy storage device.

SUMMARY

In some embodiments, the presently disclosed subject matter provides a wireless charge-discharge (WCD) energy storage device comprising an anode element, a cathode element that is proximately positioned to the anode element, a receiver coil element concentrically encircling each of the anode element and the cathode element, and a transmitter coil element concentrically encircling each of the receiver coil element, the anode element, and the cathode element. The WCD storage device further comprises a switch element that i) when set to a first position establishes a connection between the transmitter coil element and the cathode element that permits the transmitter coil element to generate a magnetic field and ii) when set to a second position prevents the connection between the transmitter coil element and the cathode element such that the receiver coil element is configured carry an induced current when the receiver coil element is positioned within a magnetic field.

In some embodiments, the presently disclosed subject matter provides a wireless charge-discharge (WCD) energy storage device comprising an integrated cathode element that includes a receiver coil element embedded within a planar cathode element, wherein the integrated cathode element includes an extended cathode contact and an integrated anode element that includes a transmitter coil element embedded within a planar anode element, wherein the integrated anode element includes an extended anode contact. The WCD energy storage device further comprises a switch element that i) when set to a first position establishes an electrical connection between the transmitter coil element and the extended cathode contact that permits the transmitter coil element to generate a magnetic field and ii) when set to a second position prevents the electrical connection between the transmitter coil element and the extended cathode contact such that the receiver coil element is configured carry an induced current when the receiver coil element is positioned within a magnetic field.

In some embodiments, the presently disclosed subject matter provides a portable wireless charging system comprising a WCD energy storage device as disclosed herein.

In other embodiments, the presently disclosed subject matter provides a method of using a WCD energy storage device in accordance with the presently disclosed subject matter to inductively source to another battery or an electronic device having wireless receiving capability.

Accordingly, it is an object of the presently disclosed subject matter to provide a wireless charge-discharge (WCD) energy storage device, a portable wireless charging system comprising a WCD energy storage device, and a method of using a WC energy storage device.

An object of the presently disclosed subject matter having been stated hereinabove, and which is achieved in whole or in part by the presently disclosed subject matter, other objects will become evident as the description proceeds when taken in connection with the accompanying drawings as best described herein below.

BRIEF DESCRIPTION OF THE DRAWINGS

A better understanding of the features and advantages of the presently disclosed subject matter will be obtained by reference to the following detailed description that sets forth illustrative embodiments, in which the principles of the presently disclosed subject matter are utilized, and the accompanying drawings of which:

FIG. 3A is a design configuration of a concentric design of a wireless charge-discharge energy storage device according to an embodiment of the subject matter described herein;

FIG. 3B is a design configuration of an electrode-coil integral design of a wireless charge-discharge energy storage device according to an embodiment of the subject matter described herein;

DETAILED DESCRIPTION

Figure 1:
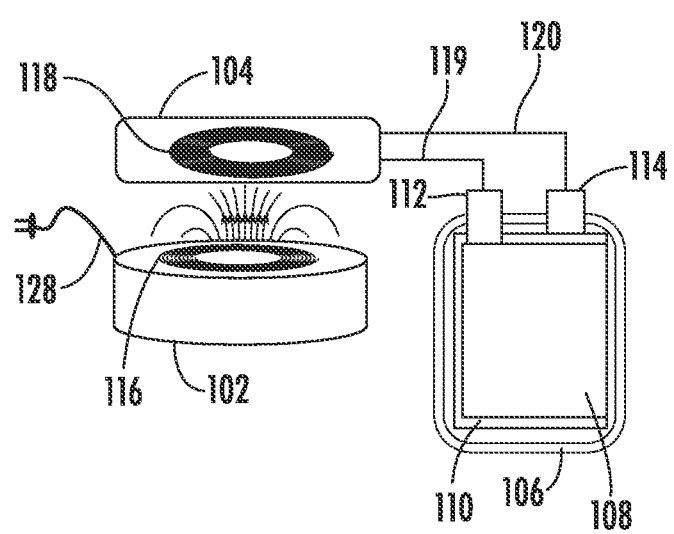
FIG. 1 is a schematic of a conventional wireless charging system utilizing a typical battery.

The presently disclosed subject matter will now be described more fully. The presently disclosed subject matter can, however, be embodied in different forms and should not be construed as limited to the embodiments set forth herein below and in the accompanying Examples. Rather, these embodiments are provided so that this disclosure will be thorough and complete, and will fully convey the scope of the embodiments to those skilled in the art.

All references listed herein, including but not limited to all patents, patent applications and publications thereof, and scientific journal articles, are incorporated herein by reference in their entireties to the extent that they supplement, explain, provide a background for, or teach methodology, techniques, and/or compositions employed herein.

Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a", "an", and "the" refer to "one or more" when used herein, including the claims.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or."

As used herein "another" can mean at least a second or more.

As used herein, the term "about", when referring to a value is meant to encompass variations of in one example ±20% or ±10%, in another example ±5%, in another example ±1%, and in still another example ±0.1% from the specified amount, as such variations are appropriate to perform the disclosed methods. Accordingly, unless indicated to the contrary, the numerical parameters set forth in this specification and attached claims are approximations that can vary depending upon the desired properties sought to be obtained by the presently disclosed subject matter.

As used herein, "wireless" refers to be able to receive and transfer energy through the air without the need for any physical wire connectors between a wireless transmitter unit and a wireless receiver unit.

As used herein, "tabless" or "terminal free" refers to an energy storage device with no external electrical contacts.

As used herein, "embedded" refers to the incorporation of a wireless transmitter unit/element and/or a wireless receiver unit in close surroundings, e.g., within the confined space of the WCD energy storage device (e.g., a wireless battery), to the device electrodes. As used herein "coaxially embedded" refers to the assembly of wireless coil elements around the electrode units along a common axis.

As used herein, "concentric" design refers to an arrangement wherein coil elements and electrodes are separate units and are arranged in a concentric sequence with a common center point.

As used herein, "integral" design refers to an arrangement wherein electrodes and coils are integrated as one single unit, e.g., coil embedded or printed on electrode(s).

As used herein, "battery component" or "battery unit" or "energy storage device" includes, but is not limited to, a positive electrode (cathode) and a negative electrode (anode), receiving and transmitting coils, diodes, switches, transistors, and similar electrical components. While the cathode, anode, and coils are flexible, components such as diodes, switches, and transistors are not typically identified as flexible. However, these parts have relatively small dimensions and can be chosen so that they do not unduly affect the flexibility of a WCD energy storage device or battery in accordance with the presently disclosed subject matter.

The presently disclosed subject matter relates generally to an energy storage device configured to enable wireless charge/discharge (WCD) battery dual functionality. In some embodiments, the configuration a WCD energy storage device includes (i) a receiver coil element that enables wireless charging of the WCD device when positioned in close proximity to an inductive electromagnetic field and (ii) a transmitter coil element that enables wireless provisioning of power to a receiving electronic device that has wireless capability and is positioned in close proximity to the transmitter coil element of the WCD energy storage device. As further disclosed herein, the WCD energy storage device in accordance with the presently disclosed subject matter is configured as an encapsulated wireless system that has no external terminals.

FIG. 1 depicts a schematic of a conventional wireless charging system utilizing a typical battery device. Namely, FIG. 1 depicts a transmitter unit 102 (e.g., a commercial device charging unit) that includes a power extension cord 128 that is configured to deliver electrical energy (via an alternating current) to transmitter unit 102 when inserted into an electrical wall outlet. When transmitter unit 102 is plugged in and powered, the alternating current (AC) electricity is provided to transmitting coils 116 of transmitter unit 102, which in turn generates a magnetic field emanating from the transmitting coils 116. When the receiving coils 118 of a receiver unit 104 is placed within the magnetic field generated by transmitter unit 102, energy is wirelessly transferred to the receiver unit 104. More specifically, a varying/changing magnetic field generated by transmitter unit 102 induces an electrical current in the receiving coils 118 of receiver unit 104 via electromagnetic (EM) induction.

As shown in FIG. 1, receiver unit 104 is directly connected to a battery unit 106. Specifically, an anode element 108 of battery unit 106 is directly coupled to receiver unit 104 via an anode contact 112 and external wire connection 119 Similarly, a cathode element 110 of battery unit 106 is directly coupled to receiver unit 104 via a cathode contact 114 and external wire connection 120. After an electrical current is induced in receiving coils 118, receiver unit 104 is configured to transfer energy and charge battery unit 106 via external wire connections 119 and 120.

Figure 2A:
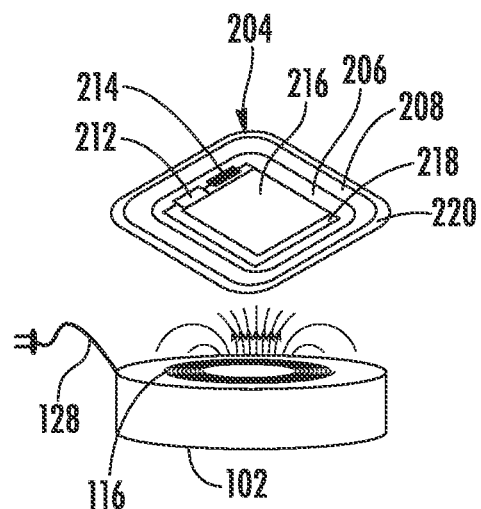
FIG. 2A is a schematic of a wireless charge-discharge energy storage device configured to function in a receiver mode according to an embodiment of the subject matter described herein.

FIG. 2A is a schematic of a WCD energy storage device configured to function in a receiver mode according to an embodiment of the subject matter described herein. While transmitter unit 102 shown in FIG. 2A is similar in form and function as transmitter unit 102 depicted in FIG. 1, WCD energy storage device 204 structurally and functionally differs from receiver unit 104 and/or battery unit 106 (as shown in FIG. 1). For example, the battery unit and receiver unit are incorporated into a single encapsulated WCD energy storage device 204. Notably, WCD energy storage device 204 comprises an anode element 216 and cathode element 218 that is concentrically encircled and surrounded by a receiver coil element 206, which in turn is encircled by a transmitter coil element 208. In some embodiments, receiver coil element 206 and transmitter coil element 208 are configured in a concentric manner such that the two elements share the same center point. Although not shown in FIG. 2A, anode contact 212 of anode element 216 and cathode contact 214 of cathode element 218 are respectively connected to a terminal end of the receiver coil element 206 and/or a terminal end of transmitter coil element 208. In particular, the electrodes (i.e., anode element 216 and cathode element 218) of WCD energy storage device 204 are directly connected to the receiver coil element 206 and transmitter coil element 208 (i.e., without the external wire connections shown in FIG. 1). Moreover, receiver coil element 206, transmitter coil element 208, anode element 216, cathode element 218, anode contact 211, and cathode contact 214 are all completely contained within an encapsulating film container 220. In some embodiments, encapsulating film container 220 comprises a flexible encapsulating film.

As indicated above, FIG. 2A depicts WCD energy storage device 204 operating in a receiver mode. More specifically, transmitter unit 102 generates a magnetic field emanating from transmitting coil 116. When receiving coil element 206 of WCD energy storage device 204 is placed within the magnetic field, energy is wirelessly transferred to WCD energy storage device 204. More specifically, an electrical current is induced in receiving coil element 206 by the varying magnetic field. The electric current then traverses along the receiving coil element 206 to anode contact 212 and effectively charges the internal battery (e.g., anode element 216 and cathode element 218). Notably, the charging and/or discharging of the internal battery can be conducted completely within encapsulating film container 220 via wireless means, thereby obviating the need for any external wire connections. Another advantage afforded by the disclosed subject matter is that there is no need to construct a positive or negative terminal (or busbar) during the assembly of the WCD energy storage device. This is beneficial in terms of battery manufacturing cost and long-term cycle life. Notably, because the terminal spot welding is typically costly and this process is one of the main reasons for causing an internal short circuit due to the small metal particles present in the assembly after metal welding.

Figure 2B:
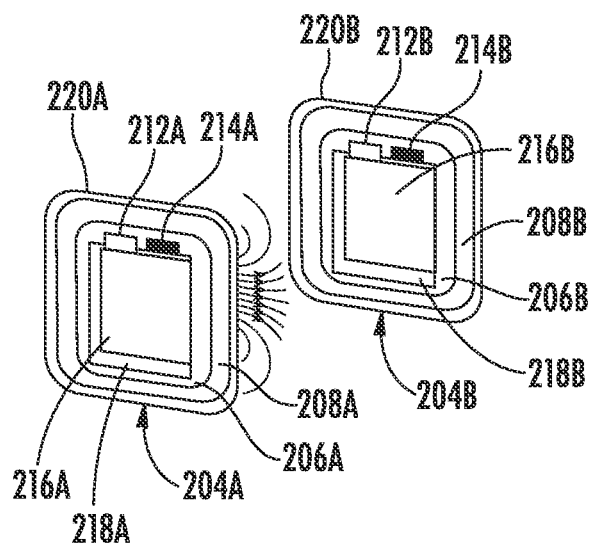
FIG. 2B is a schematic of a wireless charge-discharge energy storage device configured to function in a transmitter mode according to an embodiment of the subject matter described herein.

FIG. 2B is a schematic of a WCD energy storage device configured to function in a transmitter mode according to an embodiment of the subject matter described herein. As shown in FIG. 2B, two WCD energy storage devices 204A-204B are positioned in close proximity in order to wirelessly transfer energy via a varying magnetic field that is generated by transmitting WCD energy storage device 204A. Notably, transmitting WCD energy storage device 204A and receiving WCD energy storage device 204B are identical devices that are operating in a transmitting mode and a receiving mode, respectively. Specifically, transmitting WCD energy storage device 204A utilizes its internal battery to generate a current through transmitting coil element 208A via contacts 212A and 214A. The current traversing through transmitting coil element 208A generates the magnetic field. When the receiving coil element 206B of receiving WCD energy storage device 204 (or a receiving wireless device) is positioned within the generated (varying) magnetic field, a current is induced in receiving coil elements 206B. Notably, the induced current traverses receiving coil element 206B and charges the internal battery (e.g., anode and cathode) of WCD energy storage device 204B (or a wireless receiving device). Notably, the charging of the internal battery of WCD energy storage device 204B is conducted completely within encapsulating film container 220B and without any external wire connections. Moreover, WCD energy storage device 204A is configured to generate an electric current and magnetic field without an external power source (e.g., power cord 116 shown in FIGS. 1 and 2A).

FIG. 3A is a design configuration of a concentric design of a WCD energy storage device according to an embodiment of the subject matter described herein. Specifically, FIG. 3A depicts schematics of an internal design of a WCD energy storage device 302 that is configured in a concentric manner. In the concentric design shown in FIG. 3A, a receiver coil element 304 is positioned concentrically within (e.g., encircled by) a transmitter coil element 306. Moreover, each of the electrodes (e.g., anode element 310 and cathode element 308) of WCD energy storage device 302 are flexible elements that can be trimmed and coaxially stacked to fit inside the concentric area formed by the placement of receiver coil element 304 and transmitter coil element 306. In some embodiments, anode element 310 can comprise any anode active material (e.g., zinc, aluminum, and magnesium, and the like) and cathode element 308 can comprise any cathode active material (e.g., cobalt, nickel and manganese, and the like).

As shown in FIG. 3A, anode element 310 and cathode element 308 are flexible electrodes that are centrally positioned within WCD energy storage device 302 (e.g., cathode element 308 is planarly aligned above anode element 310 with enough space to permit an electrolyte solution to separate the electrodes and allow the electrodes to function as a battery unit) to permit receiver coil element 304 and transmitter coil element 306 to encircle the electrodes. Notably, this concentric design configuration enables the metal current collectors (e.g., cathode contact 312 and anode contact 314) of cathode element 308 and anode element 310 to not overlap with receiver coil element 304 and transmitter coil element 306. In particular, avoiding such an overlapping alignment reduces signal interference on the part of the metal current collectors (e.g., cathode element 308 and anode element 310) with the electromagnetic fields that are present when the WCD energy storage device 302 is used in either transmitting mode or receiving mode. As such, the configuration design depicted in FIG. 3A avoids the shielding of magnetic field strengths and enables a strong inductive coupling by one or more WCD energy storage devices during wireless charge-discharge operations. In some embodiments however, the design of WCD energy storage device 302 illustrated in FIG. 3A can limit the size of cathode element 308 and anode element 310 being used, which in turn can affect the volumetric energy density by limiting the amount of energy storage that may be used in a given region of space in comparison to the total volume of the battery.

As shown in FIG. 3A, transmitter coil element 306 can be wound with a plurality of turns (e.g., 'N' turns) such that a coil is formed with a center tap collected after the halfway point of the coil (e.g., 'N/2' turns). Similarly, receiver coil element 304 is configured to be i) concentrically positioned with transmitter coil element 306 and ii) has an outer dimension equal to or approximate to the inner dimension of transmitter coil element 306. In some embodiments, receiver coil element 304 has a plurality of turns (e.g., 15 turns) with no center tap.

FIG. 3A further depicts each of cathode element 308 and anode element 310 concentrically positioned within the inner dimension of receiver coil element 304. In particular, each of the electrodes (i.e., cathode element 308 and anode element 310) can be adjusted (e.g., trimmed) to fit within the inner coil size dimension of receiver coil element 304. After being adjusted, cathode element 308 can include a portion of uncoated extension on a shorter edge to enable the welding of an extended cathode contact 312. Likewise, anode element 310 can include a portion of uncoated extension on a shorter edge to enable the welding of extended anode contact 314. Additional detail regarding the construction of an exemplary WCD energy storage device 302 is provided below in the Examples section.

In some embodiments, an internal battery comprising an anode element 310 and cathode element 308 is positioned to be encircled by the receiver coil element 304. In some embodiments, the size (e.g., inner circumference) of each of the receiver coil element 304 and transmitter coil element 306 are made to be larger than the size of anode element 310 and cathode element 308 in order to avoid blocking the electromagnetic field reception and/or transmission by the metal current collectors (e.g., anode element 310 and cathode element 308).

In some embodiments, a 'wireless receiver unit' (i.e., components collectively executing wireless receiver mode capability) of WCD energy storage device 302 can be constructed by connecting (e.g., soldering) a first terminal end of receiver coil element 304 to the extended anode contact 314. Similarly, the second terminal end of receiver coil element 304 is connected to the positive terminal of a diode element 318. The negative terminal of diode element 318 is connected to the extended cathode contact 312. In some embodiments, diode element 318 enables inductive charging in a single direction and prevents a reverse discharge current flow. A diode is one example of a device that can control the directional flow of an electrical current, but other devices or combinations of devices that accomplish the same functionality are known to those of ordinary skill in the art.

Likewise, a wireless transmitter unit (i.e., components collectively executing wireless transmitting mode capability) of WCD energy storage device 302 can be constructed by employing the use of a switching transistor 320. In some embodiments, switching transistor 320 is a bipolar junction transistor (BJT) comprising a base terminal, a collector terminal, and an emitter terminal. In some embodiments, switching transistor 320 generates an alternating or varying electromagnetic field that induces wireless power transfer to inductively coupled devices (i.e., a constant electromagnetic field cannot induce wireless power transfer and/or an electrical current in a receiving coil). Switching transistor 320 is a single component that readily generates an alternating magnetic field in the transmitting mode and is exemplified herein, but other devices or combinations of devices that accomplish the same functionality are known to those of ordinary skill in the art.

As shown in FIG. 3A, the base terminal and collector terminal of switching transistor 320 are connected to the two terminal ends of transmitter coil element 306 (and the emitter terminal of switching transistor 320 is connected to both the extended anode contact 314 and a terminal end of receiver coil element 304). The center tap of the transmitter coil element 306 is connected to a first end of switch element 316.

Further, the second end of switch element 316 is connected to the extended cathode contact 312. In some embodiments, switch element 316 comprises a tactical dome switch component that can switch or toggle WCD energy storage device 302 between a wireless transmitter mode (as shown in FIG. 2B) and a wireless receiver mode (as shown in FIG. 2A). For example, switch element 316 can be set to an open, or OFF, position (e.g., open circuit) in order to place WCD energy storage device 302 in a receiver mode. Likewise, switch element 316 can be set to a closed, or ON, position (e.g., closed circuit) in order to place WCD energy storage device 302 in a transmitter mode. After the components of WCD energy storage device 302 are assembled and connected as described above, WCD energy storage device 302 can be positioned within an encapsulating film container 340 and filled with an electrolyte solution or filling. In some embodiments, the encapsulating film is a flexible packaging material (e.g., MYLAR® material) that is formed into a pouch. The flexible pouch is then vacuum sealed via a heat sealer machine and/or KAPTON® tape.

FIG. 3B is a design configuration of an electrode-coil integral design of a WCD energy storage device according to an embodiment of the subject matter described herein. Notably, FIG. 3B depicts an integral design schematic in which the electrodes and coils of WCD energy storage device are integrated as a single unit utilizing the energy storage in a given space region and do not explicitly leverage a high volumetric energy density. For example, in a conventional battery system, the separator and/or plastic plates (e.g., insulating hard material) are required to wrap each of the whole electrodes in such a manner that the level of stiffness of the electrode(s) is sufficiently maintained. Such a configuration notably isolates the electrodes and the packaging material. In a such a manner, the total thickness of the cell (of the battery system) will increase and the volumetric energy density will decrease. In contrast, the WCD energy storage device as disclosed herein includes a receiver coil element and transmitter coil element that are configured without any additional wrapping material when packaged in the encapsulating film container (e.g., the thin battery pouch/packaging material). For example, FIG. 3A depicts smaller sized electrodes (e.g., cathode element 308 and anode element 310) be utilized such that more space is occupied by the receiver coil element and the transmitter coil element (and other components). In contrast, the electrode-coil integral design depicted in FIG. 3B allows for the use of relatively larger sized electrodes (e.g., integrated cathode component and integrated anode component as described below) that fills more of the WCD energy storages device's space region, thereby resulting in increased energy storage.

As shown in FIG. 3B, WCD energy storage device 250 includes an integrated cathode component 352 and an integrated anode component 354. For example, integrated cathode component 352 comprises a receiver coil element 360 that is integrated into, printed on, and/or embedded within a cathode element 356 (e.g., a cathode sheet or plate). Likewise, integrated anode component 354 comprises an integrated transmitter coil element 362 that is integrated into, printed on, and/or embedded within an integrated anode element 358. In some embodiments, a first side of integrated cathode element 352 (e.g., aluminum foil) is applied with the cathode active material and the second side of the cathode element includes the integrated receiving coil element 360. Likewise, a first side of the integrated anode element 358 (e.g., a copper foil) is applied with the anode active material and the second side of the anode element includes the integrated transmitting coil element 362.

In some embodiments, integrated anode component 354 and integrated cathode component 352 are planarly configured in a stacked array arrangement within WCD energy storage device 350 (e.g., integrated cathode component 352 is positioned and/or aligned above integrated anode component 354 with sufficient space to permit an electrolyte solution to reside in between the electrodes and allow the electrodes to function as a battery). In some embodiments, integrated anode component 354 is a combination of and anode active material and a copper-based integrated transmitter coil element 362. Similarly, in some embodiments, integrated cathode component 352 is a combination of a cathode active material and a copper or an aluminum-based receiver coil element 360.

Each of the integrated cathode component 352 can be configured to include a portion of uncoated extension on a shorter edge to enable the welding of an extended cathode contact 366. Likewise, integrated anode component 354 can include a portion of uncoated extension on a shorter edge to enable the welding of an extended anode contact 368.

In some embodiments, a wireless receiver unit (i.e., components collectively executing wireless transmitting mode capability) of WCD energy storage device 350 can be constructed by connecting (e.g., soldering) a first terminal end of integrated receiver coil element 360 to the extended anode contact 368. Similarly, the second terminal end of receiver coil element 360 is connected to the positive terminal of a diode element 372. Further, the negative terminal of diode element 372 is connected to the extended cathode contact 366.

Likewise, a wireless transmitter unit (i.e., components collectively executing wireless transmitting mode capability) of WCD energy storage device 350 can be constructed by employing the use of a switching transistor 364. In some embodiments, switching transistor 364 is a BJT comprising a base terminal, a collector terminal, and an emitter terminal. As shown in FIG. 3B, the base terminal and collector terminal of switching transistor 364 are connected to the two terminal ends of integrated transmitter coil element 362 (and the emitter terminal of switching transistor 364 is connected to the extended anode contact 368 and a terminal end of integrated receiver coil element 360). The center tap of integrated transmitter coil element 362 is connected to a first end of a switch element 370. Further, the second end of switch element 370 is connected to the extended cathode contact 366. Switch element 370 can comprise a tactical dome switch component that can switch or toggle WCD energy storage device 350 between a wireless transmitter mode (as shown in FIG. 2B) and a wireless receiver mode (as shown in FIG. 2A). For example, switch element 370 can be set to an open, or OFF, position (e.g., open circuit) in order to place WCD energy storage device 350 in a receiver mode. Likewise, switch element 370 can be set to a closed, or ON, position (e.g., closed circuit) in order to place WCD energy storage device 350 in a transmitter mode. After the components of WCD energy storage device 350 are assembled and connected as described above, WCD energy storage device 350 is positioned and/or aligned within an encapsulating film container 378 and filled with and electrolyte solution or filling. In some embodiments, encapsulating film container is made from a flexible packaging material (e.g., MYLAR® material) that is formed into a pouch that is vacuum sealed via a heat sealer machine and/or KAPTON® tape.

EXAMPLES

The following Examples have been included to provide guidance and illustrations to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter.

Preparation of the Transmitter Coil

In some embodiments, enamel coated copper wire (30-33 American Wire Gauge (AWG), Remington Industries, Johnsburg, Ill., United States of America) can be used to construct a transmitter coil (e.g., transmitter coil element 306 in FIG. 3A) of a WCD energy storage device. Notably, the transmitter coil may comprise any flexible coil element or material capable of carrying an electrical current. For example, the transmitter coil can be adapted to i) have an outer dimension of approximately 4 centimeters (cm)×4 cm size ii) have a total of 20 turns (or higher) wound inside to form a coil that includes a center tap collected after 10 turns (or coil halfway). This configuration can result in a transmitter coil inner dimension of approximately 3.5 cm×3.5 cm size.

Preparation of the Receiver Coil

Following an analogous method described above with respect to the transmitter coil, a receiver coil (e.g., receiver coil element 304 in FIG. 3A) of a WCD energy storage device can comprise of an enamel coated copper wire (30-33 AWG). Notably, the receiver coil element may comprise any flexible coil element or material capable of carrying an electrical current. The receiver coil can be positioned in the WCD energy storage device in a concentric manner with respect to the transmitter coil (i.e., the receiver coil and the transmitter coil can share a common center point) with outer dimensions of approximately 3.5 cm×3.5 cm. The receiver coil can have at least a total of 15 turns with no center tap, which results in a receiver coil inner dimension of approximately 2 cm×2 cm. (See, e.g., FIG. 3A)

Preparation of a Cathode Electrode

In some embodiments, a high-energy cathode material, such as a lithium nickel cobalt oxide ($LiNiCoAlO_2$) (TODA America Inc., Battle Creek, Mich., United States of America) material can be used to construct a cathode electrode (e.g., cathode element 308 in FIG. 3A). The cathode electrode can be prepared by mixing the cathode material at 90 weight percent (wt %) with carbon black at 6 wt % (e.g., Imerys Graphite & Carbon, Bironico, Switzerland) and polyvinylidene fluoride at 4 wt % (e.g., SOLEF® PVDF, Solvay, Princeton, N.J., United States of America) in N-methyl pyrrolidone (Sigma Aldrich, St. Louis, Mo., United States of America). Afterwards, the produced slurry can be coated on an aluminum (Al) current collector foil (~17 µm thick, MTI Corporation, Richmond, Calif., United States of America). The resulting cathode electrode (e.g., current collector foil and applied cathode material) can then be dried in a vacuum oven at 120° C. for 12 hours. After drying, the cathode electrode is calendared and/or pressed at 3-ton pressure using a Dake Model value B-10 press (Dake, Grand Haven, Mich., United States of America) and trimmed to fit within the receiver coil size dimension (e.g., approximately 1.8 cm×1.8 cm). The cathode electrode can be characterized as having a high loading of 5 milligrams per $cm^2$ ($mg/cm^2$). After trimming, the cathode electrode can be left with at least an 0.4 cm×0.4 cm uncoated extension on a shorter edge to enable the welding of tab terminals, i.e., soldering the electrical circuit connections (e.g., extended cathode contact 312 in FIG. 3A). For example, the cathode electrode can be welded with an aluminum (Al) extension (MTI Corporation, Richmond, Calif., United States of America) using an ultrasonic spot welding machine.

Preparation of an Anode Electrode

In some embodiments, a high energy silicon-iron metal alloy can be prepared according to the methods generally disclosed in Alaboina, P. K., Cho, J-S., Uddin, M-J., Cho, S-J. "Alaboina, Pankaj K., et al. "Mechanically prelithiated silicon nano alloy as highly engineered anode material." *Electrochimica Acta* 258 (2017): 623-630.

For example, an anode slurry can be prepared by mixing a silicon-iron metal alloy (15.1 wt. %), Mitsubishi Natural Graphite (53.1 wt. %)(Mitsubishi Chemical Company, Tokyo, Japan), SFG6 graphite (22.8 wt. %)(Imerys Graphite & Carbon, Bironico, Switzerland), polyamide-imide binder (8 wt. %, Aekyung, Chemical Company, Ltd., Seoul, Korea), and Ketjen Black (1.0 wt. %)(Lion Specialty Chemicals Company, Ltd., Tokyo, Japan) in a deionized water solvent. The resulting anode slurry can be coated on a Nickel-Copper flexible substrate (e.g., substrate having a thickness of ~89 µm, Assurance Fabrics by Tylson), which is subsequently dried in a vacuum oven at 120 degrees Celsius (° C.) for approximately 12 hours, to produce an anode electrode (e.g., anode element 310 in FIG. 3A).

After drying, the anode electrode can be calendared and/or pressed at 3-ton pressure using a Dake Model value B-10 press and trimmed to approximately 2 cm×2 cm size to fit within the inner receiver coil size dimension. The anode electrode can have a high loading of 3 $mg/cm^2$. After trimming, the anode electrode can be left with at least an 0.4 cm×0.4 cm uncoated extension on a shorter edge to enable welding tab terminals, i.e., soldering the electrical circuit connections (e.g., extended anode contact 314 as shown in FIG. 3A). In some embodiments, the anode electrode is welded with a nickel (Ni) extension (MTI Corporation, Richmond, Calif., United States of America) using an ultrasonic spot welding machine.

Preparation of the Battery Configuration

In some embodiments, the anode electrode is wrapped with C480 separator (e.g., 2.2 cm×2.2 cm and ~22 µm thick (Celgard, Charlotte, N.C., United States of America) and aligned with the cathode electrode encircled by the receiver coil and transmitter coil (e.g., see FIG. 3A) in a stacked array configuration.

In order to construct a wireless receiver unit for the WCD energy storage device, one end of the receiver coil is soldered to the anode's nickel extension. The other end of the receiver coil is connected to the positive terminal of a 1N4148 diode (ON Semiconductor, Phoenix, Ariz., United States of America). Further, the negative terminal of the diode is connected to the cathode's aluminum extension (e.g., see extended cathode contact 312 in FIG. 3A).

Likewise, to prepare the wireless transmitter unit of the WCD energy storage device, the base terminal and collector terminal of a MMBT2222A switching transistor (e.g., a standard surface mount transistor in SOT-23 packaging, Uxcell, Hong Kong) are each soldered to one end of the transmitter coil (i.e., the base terminal is connected to a first end of the transmitter coil and the collector terminal is connected to a second end of the transmitter coil). Further, the center tap of the transmitter coil is connected to one end of a tactile dome switch element (E-Switch, Inc., Minneapolis, Minn., United States of America) (e.g., 4.5 millimeter (mm)×4.5 mm×0.5 mm dimensions), which switches the WCD energy storage device between a wireless transmitter mode and a wireless receiver mode. The other end of the switch element is connected to the cathode's aluminum extension (e.g., extended cathode contact 312 in FIG. 3A).

Preparation of the Pouch Cell

In some embodiments, the complete assembled battery configuration of the WCD energy storage device is then placed in a 6 cm×6 cm flexible packaging material (e.g., that available from under the registered trademark MYLAR® from DuPont Teijin Films USA, Chester, Va., United States of America). For example, a non-metallic food packaging (QQ Studio) can be used to encapsulate the WCD energy storage device's components/elements that are further secured using 0.0254 mm thick KAPTON® tape (Lucent Path, Monterey Park, Calif., United States of America using Amazon.com). Specifically, the battery configuration assembly can be placed inside a MYLAR® container pouch and fixed using KAPTON® tape (e.g., insulation film) to secure the components of the WCD storage device in the correct alignment (which prevents rearrangement when the device is handled). After being placed inside and secured in the MYLAR® container pouch, the container pouch can be vacuum-sealed.

In some embodiments, the flexible pouch cell container can be sealed on three edges using an impulse manual heat sealer machine. The remaining edge of the pouch cell is left open to receive an electrolyte filling and a final vacuum sealing. The assembly (e.g., the flexible pouch cell) was then moved into a sealed glove box for electrolyte wetting of the WCD energy storage device's electrodes using an electrolyte solution (e.g., 1 molar (1M) Lithium Hexafluorophosphate ($LiPF_6$) in ethylene carbonate (EC)/diethyl carbonate (DEC)/fluoroethylene carbonate (FEC) 5/70/25 v/v, Panax E-Tec Co., Ltd, Busan, Korea). After injecting approximately 100 microliters (µl)-200 µl of electrolyte solution, the flexible pouch cell container is allowed to rest for at least about 15 minutes to permit electrolyte wetting of the electrodes. Afterwards, excess electrolyte solution can be removed, and the pouch cell container can be temporarily sealed using an impulse hand sealer. At this stage, the pouch cell is then ready for a final vacuum sealing. To accomplish the final vacuum sealing, the manually sealed edge is placed on the sealing bar of the vacuum sealer device (e.g., VP210 Chamber Tabletop Vacuum Packaging Machine with 10¼" Seal Bar, VacMaster, Overland Park, Kans., United States of America) and subjected to a vacuum for 15 seconds (e.g., for an evacuation of 0.08 megapascal (MPa)), thereby completely enclosing and/or encapsulating the WCD energy storage device on all sides. The sealed pouch cell can then be trimmed to remove excess pouch cell material.

Performance Evaluation and Discussion

Figure 4A:
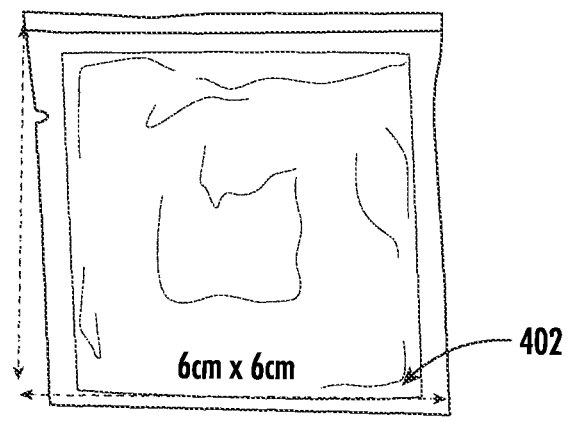
FIG. 4A is a photograph of a wireless charge-discharge energy storage device after assembly according to an embodiment of the subject matter described herein.
Figure 4B:
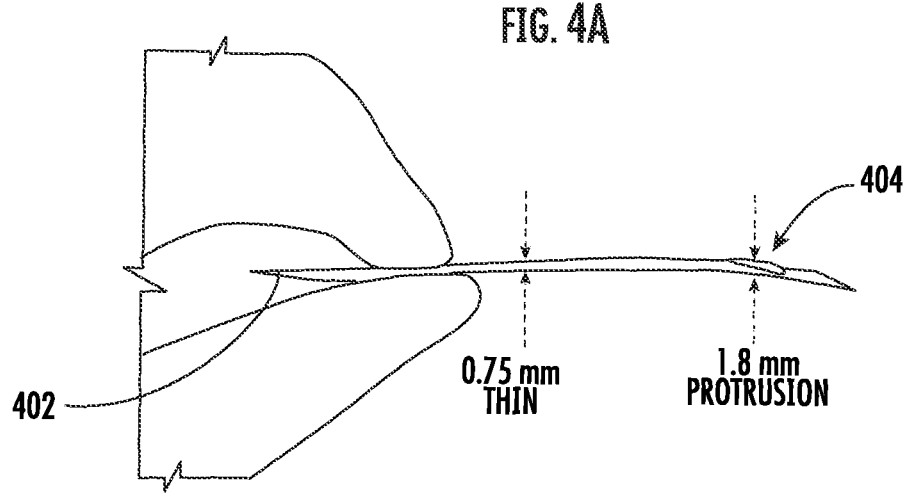
FIG. 4B is a photograph of a wireless charge-discharge energy storage device in side view according to an embodiment of the subject matter described herein.
Figure 4C:
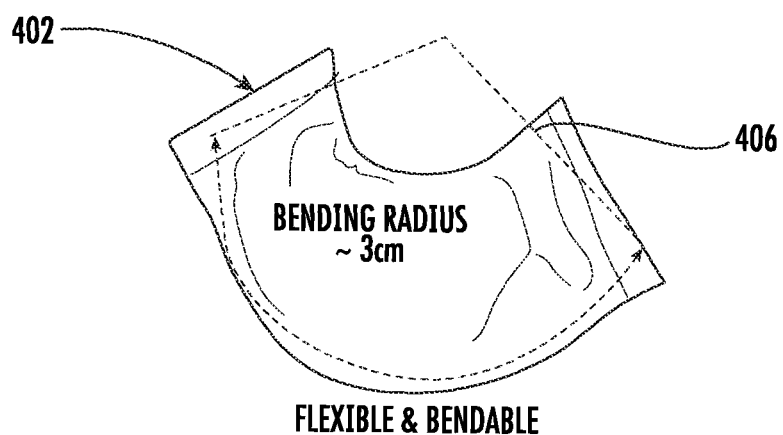
FIG. 4C is a photograph of a wireless charge-discharge energy storage device after assembly and flexed in a bent configuration according to an embodiment of the subject matter described herein.

In some embodiments, WCD energy storage devices (e.g., WCD dual functional batteries) can be prepared in a variety of methods as disclosed herein. FIG. 4A is a photograph of a wireless charge-discharge energy storage device after assembly according to an embodiment of the subject matter described herein. In particular, FIG. 4A depicts an WCD energy storage device 402 after assembly and characterized with dimensions of 6±0.05 cm width×6±0.05 cm length. In FIG. 4B, depicted WCD energy storage device 402 is lightweight (e.g., 3.7±0.3 g) and thin (e.g., 0.75±0.7 mm), except at the location 404 of the switching transistor where the thickness is measured at 1.8±0.1 mm. FIG. 4C depicts the aforementioned WCD energy storage device 402, having a length of ~6 cm, as being flexible and exhibiting a ~3 cm bending radius. In particular, FIG. 4C depicts an inside radius of curvature 406 when WCD energy storage device 402 is bent, wherein a smaller bend radius would correspond to a more flexible sample. Notably, WCD energy storage device 402 as shown in FIGS. 4A-4C is contactless and/or tables.

Figure 5:
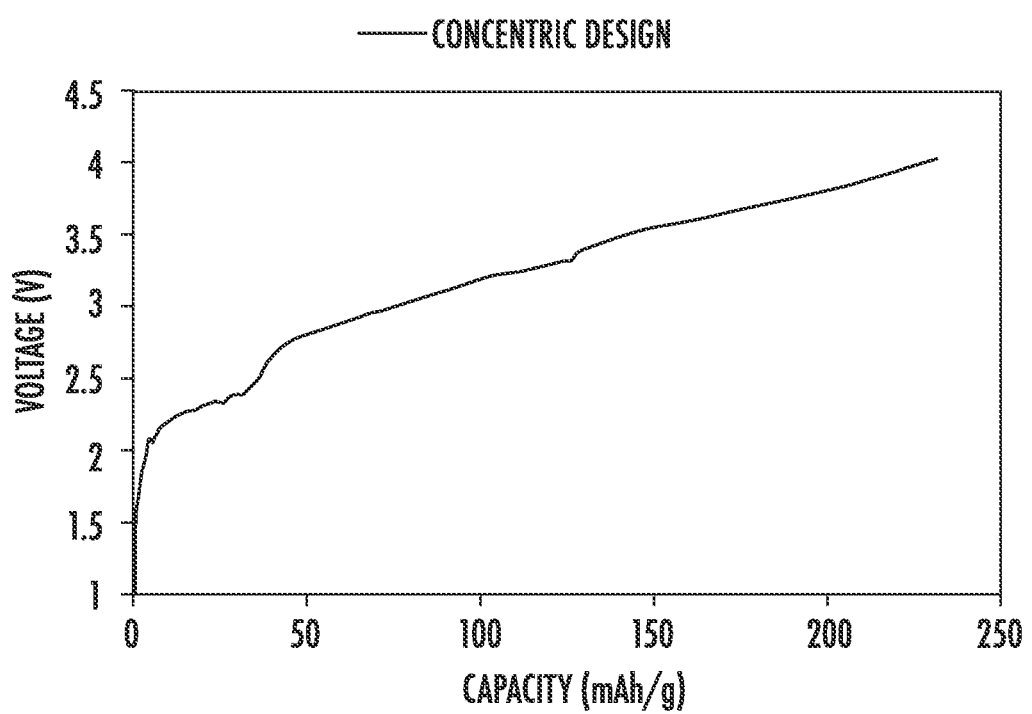
FIG. 5 is graph of the formation charging of the wireless charge-discharge energy storage device according to an embodiment of the subject matter described herein.

In order for the voltage to be monitored during charge and/or discharge operations, the assembly of the WCD energy storage device was initially made with contact tabs. To safely operate the WCD energy storage device 402, it was necessary to manually disconnect the contact tabs before the WCD energy storage device 402 was overcharged. In one embodiment, incorporating a charge protection circuit eliminates the concern of overcharging the battery. Notably, the choice of a charge protection circuit is based on a number of factors, including effect on the thickness, flexibility, and/or weight of the battery. Via the contact tabs, slow formation charging of the battery was performed using a Toyo TOSCAT 3100 battery cycler (Toyo System USA, Inc., Columbus, Ohio, United States of America) at 0.26 milliampere (mA) in the potential range of 2.5 volts (V)-4.0 V. FIG. 5 depicts a graph of the charge capacity of 232.0 mAh/g for a WCD energy storage device with a concentric design.

In a WCD concentric design configuration, the sizes of the transmitter coil and the receiver coil were made larger than the size of the electrodes to avoid blocking the electromagnetic field reception and/or transmission by the metal current collectors (e.g., foil elements) of the electrodes. The anode material was coated on a flexible substrate chosen because it can allow electromagnetic field impregnations, as well as tolerating bending pressure without mechanical degradation.

In some embodiments, aluminum foil was used as the cathode collector. The aluminum foil in the cathode electrode can contribute to the blocking of the electromagnetic field, but reducing the size of the cathode electrode such that it is smaller than each of the transmitter coil size and receiver coil size minimizes this impact. Small holes can also be added to the cathode electrode to allow electromagnetic field penetration. However, this electromagnetic field penetration needs to be balanced against any unwanted electrochemical capacity loss. One advantage of the concentric design is that electromagnetic field interferences due to the electrodes (e.g., cathode element 308 and anode element 310 in FIG. 3A) are minimized, thereby resulting in more stable inductive coupling interactions. As such, wireless charging cycles are less affected by voltage fluctuations. The electrode details and the formation cycle performance are summarized below in Table 1. Notably, Table 1 depicts electrode details and formation charge performance of the wireless charge-discharge energy storage device in the voltage window of 2.5 V-4.0 V and an associated 0.26 mA charging current.

TABLE 1

| Wireless Battery NCA/Si—Fe Alloy | Electrolyte Amount | Electrode Dimensions (cm × cm) | | Electrode Thickness (μm) | | Electrode Loading (mg/cm$^2$) | | Charge Capacity (mAh/g) |
|---|---|---|---|---|---|---|---|---|
| | | Cathode | Anode | Cathode | Anode | Cathode | Anode | |
| Concentric Design | 100 μl | 1.8 × 1.8 | 2 × 2 | 40 | 95 | ~5 | ~3 | 232.0 |

In one variation of the current assembly, a copper-base substrate is used as the cathode collector. However, use of a copper foil as an anode material can contribute to blocking the electromagnetic field and reducing wireless functionality. In addition, copper-based substrates can suffer from oxidation instabilities at higher voltages.

After stable formation-charging, the WCD energy storage device was tested as both a wireless receiver and a wireless transmitter. In a normal mode, the switch is set to open (OFF) and the WCD energy storage device is configured to function in the (normal) receiver mode. In some instances, the WCD energy storage device was placed on top of a Qi charging pad (DanForce using Amazon.com). During one wireless charge (e.g., from 2.08 V to 2.39 V), the WCD energy storage device had charging fluctuation jumps, as evident during the voltage monitoring. Charging fluctuations can affect the life span of the WCD energy storage device as well as the reversible capacity of the device's electrodes. Such jumps can be eliminated if the WCD energy storage device is prepared with either full alternating current (AC) rectifiers or charge control regulators.

Figure 6A:
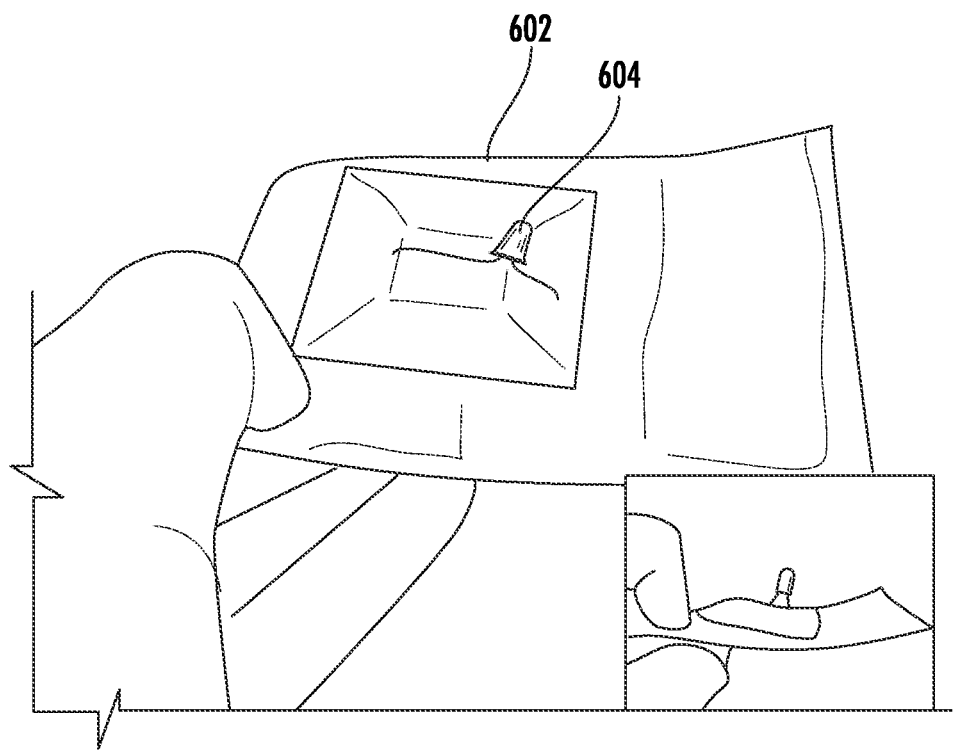
FIG. 6A is a photograph of a wireless charge-discharge energy storage device switched to a transmitter operating mode according to an embodiment of the subject matter described herein.

In some instances, the disclosed WCD energy storage device charged from 2.08 V to 2.39 V thereby demonstrating its wireless charging capability. The WCD energy storage device could be charged to higher voltages but requires the supply from the charging pad to be cut-off in order to avoid overcharging issues. The risk of overcharging can be reduced by incorporating a protection circuit in the battery design. Notably, incorporation of a protection circuit can be designed to minimize any negative impacts of the wireless operation and/or overall flexibility of the WCD energy storage device. In the transmitter mode, i.e., when the tactical dome switch is pressed (ON), the WCD energy storage device can transmit power to electronic devices capable of forming inductive coupling. As shown in FIG. 6A, the WCD energy storage device was able to inductively light a ~3.0 V blue LED 604, which was connected to a coil winding acting as a wireless receiver.

Figure 6B:
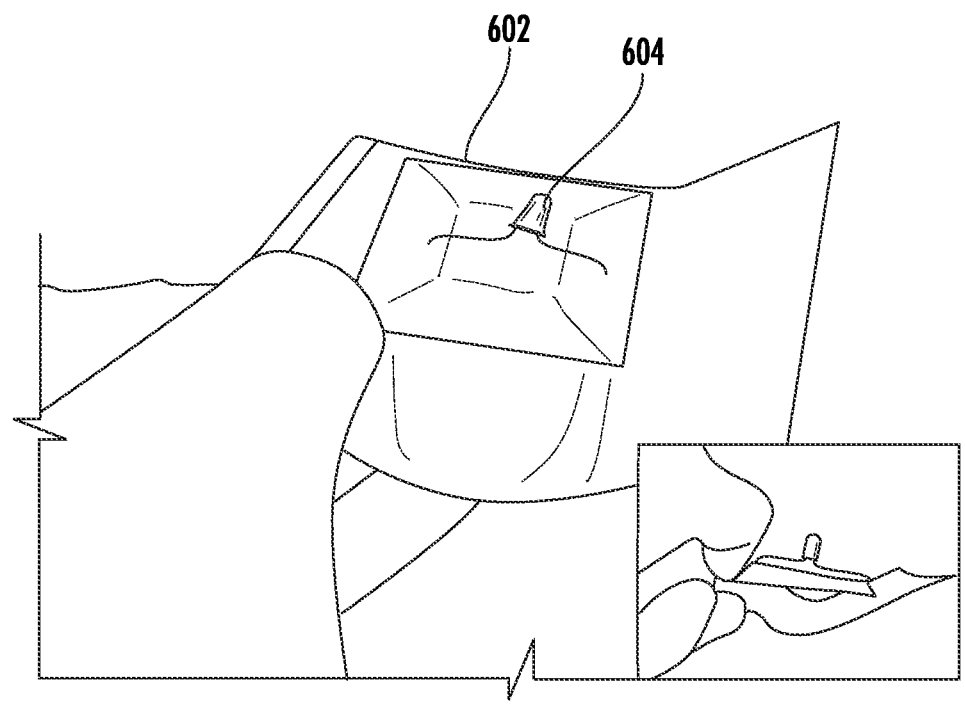
FIG. 6B is a photograph of a wireless charge-discharge energy storage device switched to transmitter mode while in a bent position according to an embodiment of the subject matter described herein.

In FIG. 6B, the WCD energy storage device was bent at approximately a 3 cm radius position, and the LED lighting test was performed in the transmitter mode. Even while bent, the WCD energy storage device was able to inductively light up a ~3.0 V blue LED. In this bent position, however, the brightness level of the LED was reduced when compared to scenarios where the WCD energy storage device was in an unbent or flat position. Notably, this was due to the reduced inductive coupling efficiency with the LED receiver coil (caused by the bending of the WCD energy storage device).

As shown herein, the wireless charge-discharge dual function was fully integrated into a battery design, resulting in a WCD energy storage device that could be wirelessly charged by a magnetic field as well as having the capability to wireless transmit power to other electronic devices. Notably, the WCD energy storage device described herein eliminates the need for tab connectors to perform either of these functions.

A WCD energy storage device of the presently disclosed subject matter can comprise a wireless battery that can wirelessly connect to an inductive charging source and transmit power to another battery or electronic device with wireless capability. In addition, a WCD energy storage device of the presently disclosed subject matter, which lacks external contacts or terminals, can be fully sealed in an encapulating package or container. Without contact terminals that are adversely affected by wear and tear, the lifetime usage of such a WCD energy storage device is increased (as compared to a conventional battery). Further, the risk of external terminal short circuit accidents is reduced and/or avoided. Further, a WCD energy storage device of the presently disclosed subject matter has flexibility and bendability characteristics without the corresponding mechanical degradation.

In some embodiments, pouch cells made up of non-metallic food packaging material (e.g., that available from under the registered trademark MYLAR® from DuPont Teijin Films USA, Chester, Va., United States of America) were constructed to limit blocking of the electromagnetic field strength and impart flexibility to the design. Other packaging material can be identified for use in lieu of MYLAR® material by those of ordinary skill in the art so long as the alternative material (a) does not block an electromagnetic field during transmission/reception, e.g., plastics; (b) does not limit flexibility but is sufficiently thick to protect internal components; (c) can be readily sealed; and (d) is compatible with the components of the WCD energy storage device.

It will be understood that various details of the presently disclosed subject matter may be changed without departing from the scope of the presently disclosed subject matter. Furthermore, the foregoing description is for the purpose of illustration only, and not for the purpose of limitation.

The invention claimed is:

1. A wireless charge-discharge (WCD) energy storage device, comprising:
   an anode element;
   a cathode element that is proximately positioned to the anode element;
   a receiver coil element concentrically encircling each of the anode element and the cathode element;
   a transmitter coil element concentrically encircling each of the receiver coil element, the anode element, and the cathode element; and
   a switch element that i) when set to a first position establishes a connection between the transmitter coil element and the cathode element that permits the transmitter coil element to generate a magnetic field and ii) when set to a second position prevents the connection between the transmitter coil element and the cathode element such that the receiver coil element is configured to carry an induced current when the receiver coil element is positioned within a magnetic field; wherein the anode element, the cathode element, the receiver coil element, the transmitter coil element and the switch element are completely contained within an encapsulating film container.

2. The WCD energy storage device of claim 1, wherein the magnetic field generated by the transmitter coil element is created by an electrical current produced by the anode element and received by the cathode element via the transmitter coil element.

3. The WCD energy storage device of claim 1, wherein a space between the anode element and the cathode element is filled by an electrolyte solution.

4. The WCD energy storage device of claim 1, wherein the magnetic field generated by the transmitter coil element is used to wirelessly induce an electrical current that provides power to charge a battery unit contained within a receiving wireless device.

5. The WCD energy storage device of claim 1, wherein each of the transmitter coil element and the receiver coil element comprises a flexible coil element.

6. The WCD energy storage device of claim 1, wherein the cathode element includes an extended cathode contact and the anode element includes an extended anode contact.

7. The WCD energy storage device of claim 1, wherein the anode element and the cathode element comprise flexible electrode components and the encapsulating film container comprises a flexible packaging material.

8. The WCD energy storage device of claim 7, wherein a connection between the receiver coil element and at least one of an extended cathode contact and an extended anode contact is direct and is established completely within the encapsulating film container.

9. The WCD energy storage device of claim 8, wherein a connection between the transmitter coil element and at least one of the extended cathode contact and the extended anode contact is direct and is established completely within the encapsulating film container.

10. A wireless charge-discharge (WCD) energy storage device, comprising:
    an integrated cathode element that includes a receiver coil element embedded within a planar cathode element, wherein the integrated cathode element includes an extended cathode contact;
    an integrated anode element that includes a transmitter coil element embedded within a planar anode element, wherein the integrated anode element includes an extended anode contact; and
    a switch element that i) when set to a first position establishes an electrical connection between the transmitter coil element and the extended cathode contact that permits the transmitter coil element to generate a magnetic field and ii) when set to a second position prevents the electrical connection between the transmitter coil element and the extended cathode contact such that the receiver coil element is configured to carry an induced current when the receiver coil element is positioned within a magnetic field; wherein the integrated anode element and the integrated cathode element, are completely contained within an encapsulating film container.

11. The WCD energy storage device of claim 10, wherein the receiver coil element is coaxially embedded with the planar cathode element.

12. The WCD energy storage device of claim 10, wherein the transmitter coil element is coaxially embedded with the planar anode element.

13. The WCD energy storage device of claim 10, wherein the magnetic field generated by the transmitter coil element is created by an electrical current produced by the planar anode element and received by the planar cathode element via the transmitter coil element.

14. The WCD energy storage device of claim 10, wherein a space between the integrated anode element and the integrated cathode element is filled by an electrolyte solution.

15. The WCD energy storage device of claim 10, wherein the magnetic field generated by the transmitter coil element is used to wirelessly induce an electrical current that provides power to charge a battery unit contained within a receiving wireless device.

16. The WCD energy storage device of claim 10, wherein the integrated anode element and the integrated cathode element comprise flexible electrode components and the encapsulating film container comprises a flexible packaging material.

17. The WCD energy storage device of claim 16, wherein a connection between the receiver coil element and at least one of the extended cathode contact and the extended anode contact is direct and is established completely within the encapsulating film container.

18. The WCD energy storage device of claim 17, wherein a connection between the transmitter coil element and at least one of the extended cathode contact and the extended anode contact is direct and is established completely within the encapsulating film container.

* * * * *